United States Patent [19]

Adelson et al.

[11] 4,014,442
[45] Mar. 29, 1977

[54] STACKER CRANE FOR STOREHOUSES

[76] Inventors: Jury Abramovich Adelson, prospekt Karla Marxa 21, kv. 57; Oleg Antonovich Tamkovich, Moskovsky prospekt, 153, kv. 141, both of Leningrad, U.S.S.R.

[22] Filed: Apr. 18, 1975

[21] Appl. No.: 569,386

[52] U.S. Cl. .................... 214/16.4 A; 214/75 R; 214/16.1 CB
[51] Int. Cl.² .................................. B65G 47/00
[58] Field of Search ............... 214/16.4 A, 16.4 R, 214/16.4 B, 16.1 CB, 16.1 C, 16.1 CC, 75 R

[56] References Cited

UNITED STATES PATENTS

| | | | |
|---|---|---|---|
| 2,826,312 | 3/1958 | Francis | 214/16.1 CB |
| 3,175,722 | 3/1965 | Paulssen | 214/16.4 A |
| 3,445,010 | 5/1969 | Alstedt et al. | 214/16.4 A |
| 3,608,749 | 9/1971 | Zollinger | 214/16.4 A |
| 3,863,777 | 2/1975 | Murata | 214/16.4 A |

FOREIGN PATENTS OR APPLICATIONS

| | | | |
|---|---|---|---|
| 703,068 | 4/1966 | Italy | 214/16.4 A |
| 218,390 | 6/1968 | U.S.S.R. | 214/16.4 A |
| 235,625 | 1/1969 | U.S.S.R. | 214/16.4 A |
| 1,207,146 | 9/1970 | United Kingdom | 214/16.4 A |
| 1,175,652 | 12/1969 | United Kingdom | 214/16.4 A |

*Primary Examiner*—Robert J. Spar
*Assistant Examiner*—R. B. Johnson

[57] ABSTRACT

A stacker crane for use in storehouses where piece loads are kept on racks, comprising a frame adapted for moving horizontally across the racks and carrying columns arranged at the side ends of the racks, at a certain distance from them, said columns supporting a handler which is capable of moving along the columns and is intended for stacking loads in the racks. The stacker crane has a device for rearranging the piece loads on the handler, the device being installed in guides which are mounted on the frame parallel with the crosshead of the handler and which are practically of the same length as the crosshead, the load-carrying elements of the stacker crane being adapted for receiving the piece load from load-supporting platforms of the handler and capable of moving relative to said guides. The device is capable of rearranging the loads on the grab in compliance with a preset program for accumulating a lot of loads which improves utilization of the surface area of the handler.

2 Claims, 19 Drawing Figures

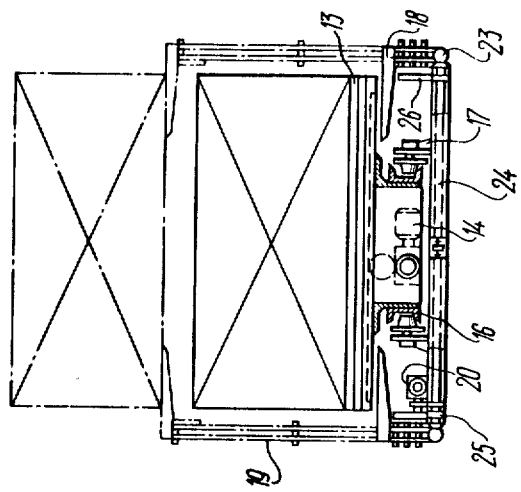
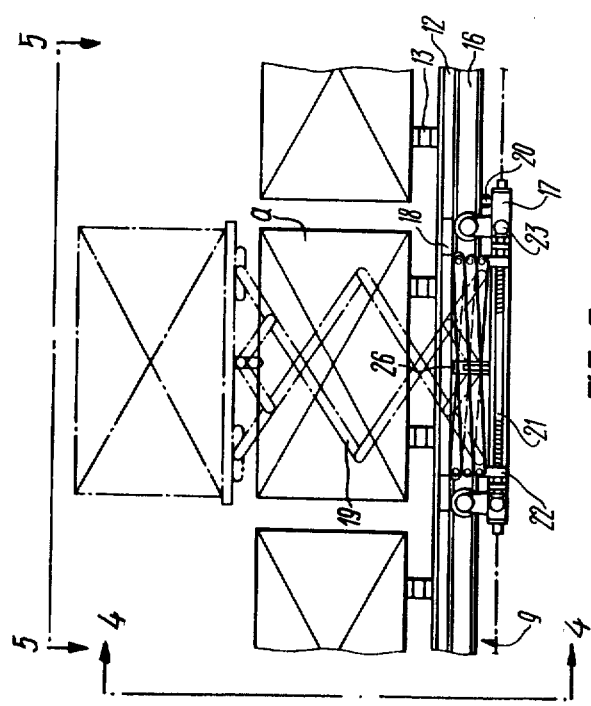
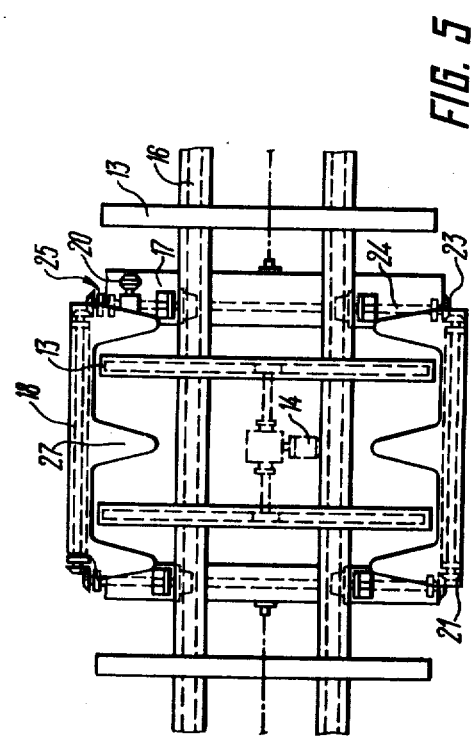

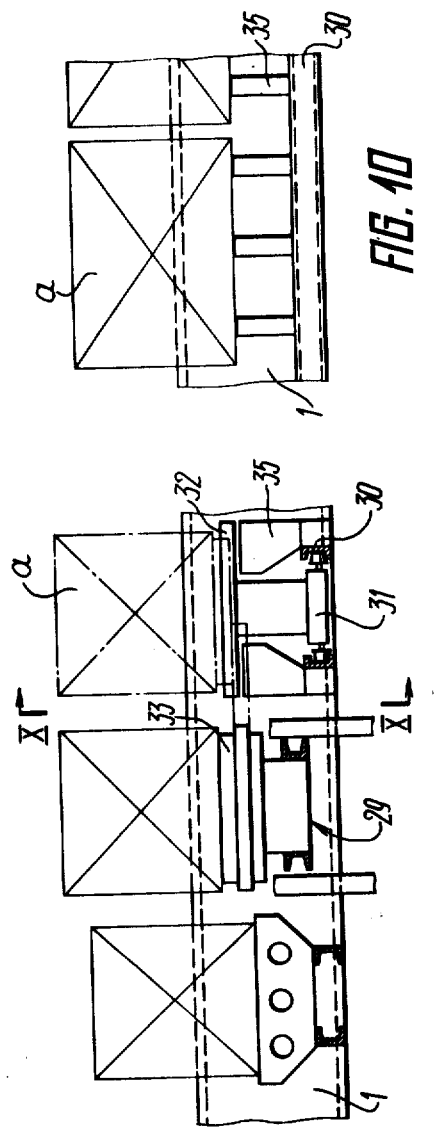

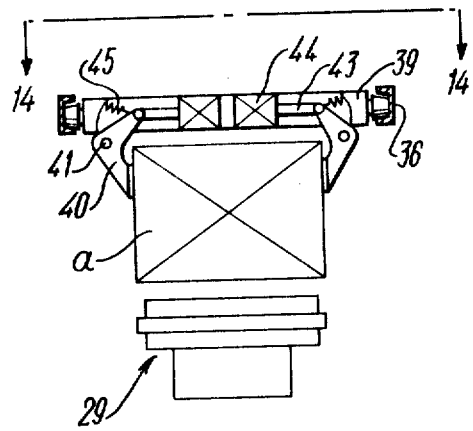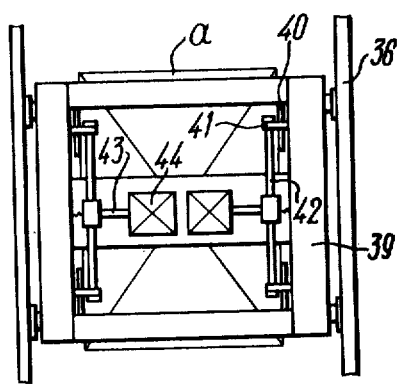
FIG. 13  FIG. 14
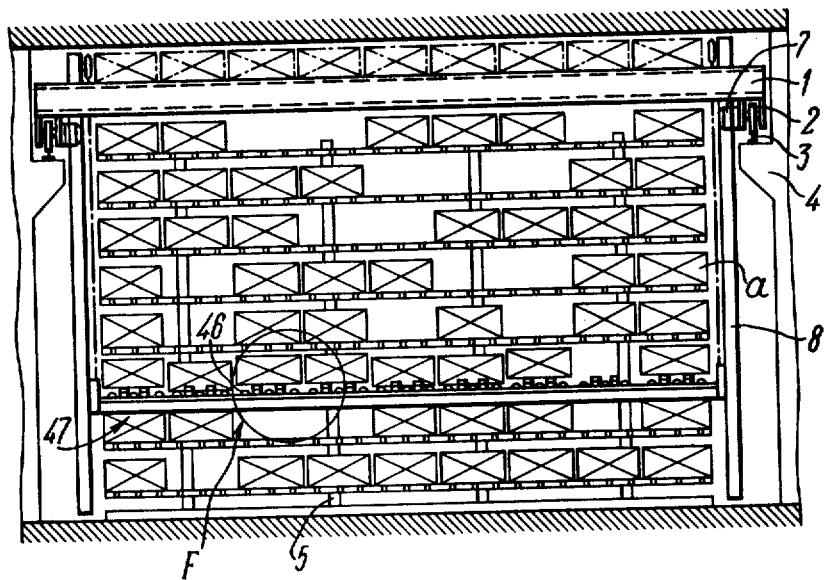
FIG. 15

STACKER CRANE FOR STOREHOUSES

The present invention relates to storehouse equipment and more specifically it relates to stacker cranes used in storehouses where piece loads are kept on racks.

The stacker crane according to the present invention can be used to the best of advantage in storehouses stocked with a large assortment of loads.

Known in the previous art are stacker cranes for use in storehouses where piece loads are kept on racks. These cranes comprise a frame mounted on wheels moving over rail tracks which are secured on the structures of the storehouse building. The frame is provided with columns arranged at the side ends of the racks, at a certain distance from them. These columns carry a load grab capable of moving along said columns. This load grab is made in the form of a crosshead directed along the racks and provided with a number of load-carrying platforms for stacking loads on racks. The platforms are spaced at a certain distance from one another throughout the length of the crosshead. The platforms are of the telescopic type and can be extended in the opposite directions for stacking loads on the racks located on both sides of the load grab.

The frame with the columns carrying the load grab moves horizontally across the racks.

The above-described stacker cranes are intended for stacking piece loads in packs without pallets in storehouses with homogeneous loads and cannot be utilized for selective gathering of piece loads and placing them in groups on racks in storehouses with a wide assortment of loads.

An object of the present invention is to provide a stacker crane for use in storehouses where piece loads are kept on racks comprising a device for rearranging the loads on the handler or grab to allow their selective gathering for subsequent stacking of these loads in groups on racks.

In accordance with these and other objects we hereby provide a stacker crane for use in storehouses where piece loads are kept on racks which comprises a frame adapted for moving horizontally across the racks and carrying columns arranged at the side ends of the racks, at a certain distance from them, the columns supporting the handler or load grab which is capable of moving along the columns. The grab is made in the form of a crosshead arranged along the racks and equipped with a multitude of load-supporting platforms located at a certain distance from one another and intended for stacking the loads on the racks.

According to the invention, the stacker crane has a device for rearranging the piece loads on the load grab, the device being installed in guides which are mounted on the frame parallel with the crosshead of the load grab and which are practically of the same length as the crosshead, load-carrying elements of the stacker crane being adapted for receiving the piece loads from the load-supporting platforms of the load grab and capable of moving relative to the guides.

It is recommended that the guides are rigidly secured on the crosshead and the device for rearranging the loads on the handler includes a carriage installed in these guides and the load-carrying elements in the form of bars arranged on the sides of the carriage parallel with said guides and kinematically linked with the carriage by means of articulated-link mechanisms provided with a drive intended to move the bars vertically above the supporting platforms while rearranging the piece loads on the grab and below these platforms while stacking the piece loads on racks.

Such a device for rearranging the loads on the grab ensures a comparatively high output of the stacker crane in gathering sets of loads and is most versatile since it can be used either with telescopic or immovable load-supporting platforms.

It is no less practicable that each bar should have lateral projections, facing the middle of the carriage and spaced at such distances from one another as to allow free passage of the projections between the load grab platforms. The projections allow the bars to be used for rearranging the loads whose width is smaller than the length of the grab load-supporting platforms.

It is possible to secure the guides rigidly on the frame and provide the device for rearranging the loads on the load grab with a carriage installed in these guides and with load-carrying elements in the form of vertical ribs which are rigidly secured on the carriage perpendicularly to the direction of its movement and which are somewhat higher than the load-supporting platforms of the load grab.

This layout of the device for rearranging the loads on the grab is simplest in design and can be used in storehouses with a comparatively small nomenclature of loads.

It is well motivated that the frame on both sides of the guides has a multitude of rigidly secured load-carrying elements installed in the direction of frame movement, spaced at a certain distance from one another throughout the length of the guides and being somewhat higher than the load-supporting platforms of the grab.

The arrangement of the load-carrying elements on both sides of the guides steps up the output of the stacker crane engaged in placing packs of loads on racks.

It is also practicable that the guides are rigidly secured on the frame above the load grab, and the device for rearranging the loads on the load grab comprises a carriage installed in these guides, and load-carrying elements in the form of arms located on the sides of the carriage, gripping the load from above and provided with horizontal pivots secured on the carriage, the arms at each side of the carriage being interconnected in pairs and kinematically linked with a drive for their turning. Such a layout of the device for rearranging the loads on the grab will find preferable employment in storehouses where loads are kept in hard packing.

The next characteristic of the present invention lies in that the guides are connected by an articulated-link mechanism with the grab crosshead and the device for rearranging the loads on the grab is made in the form of a number of power-driven rollers serving as load-carrying elements, located between the load-supporting platforms of the grab and installed in the guides. The articulated-link mechanism is kinematically linked with the drive intended to move the guides vertically relative to the crosshead for bringing the rollers above the platforms while the piece loads are being rearranged on the grab, and below these platforms while the piece loads are being stacked on racks.

Such a layout of the device for rearranging the loads steps up considerably the output of stacker cranes engaged in handling the loads in storehouses with a large turnover of loads.

The stacker crane according to the present invention increases the efficiency of handling piece loads in storehouses with a large assortment of loads by rearranging the piece loads on the handler or load grab for gathering a large number of goods according to the preset program.

The above-stated objects and advantages of the stacker crane for use in storehouses will become more apparent from a description of preferred, exemplary embodiments of the present invention with reference to the accompanying drawings in which:

FIG. 3 shows fragment A in FIG. 1, enlarged;

FIG. 4 is a view along line 4—4 in FIG. 3;

FIG. 5 is a view along line 5—5 in FIG. 3;

Figure 8:
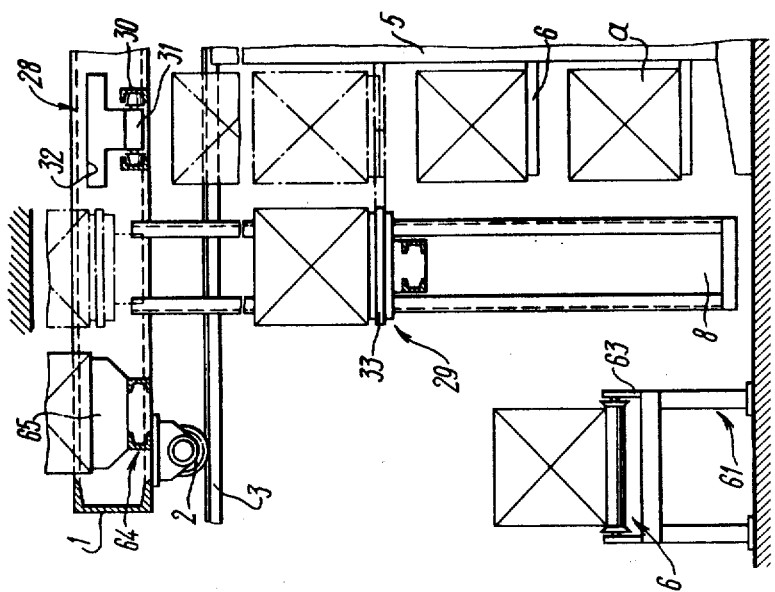
Figure 6:
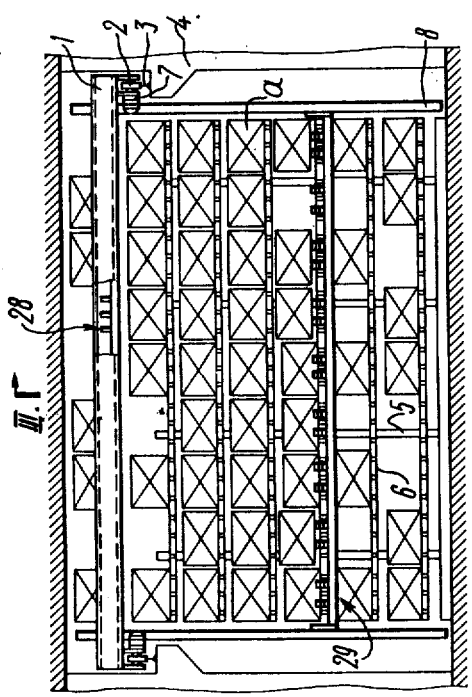
FIG. 6 is a front view of the stacker crane according to the invention, in another version.
Figure 7:
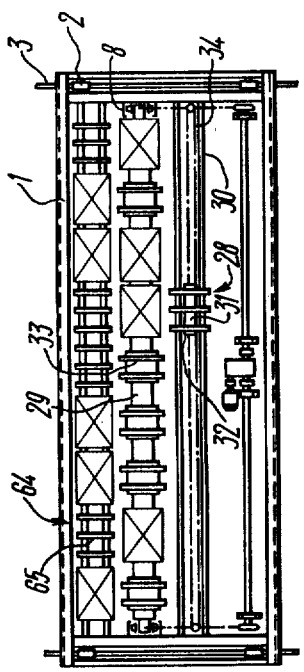
Figure 12:
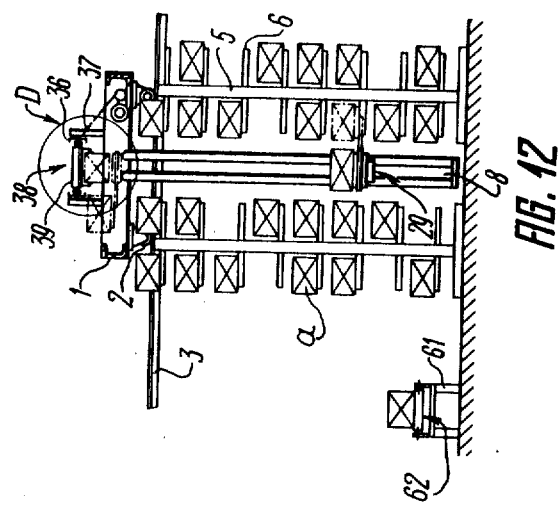
Figure 11:
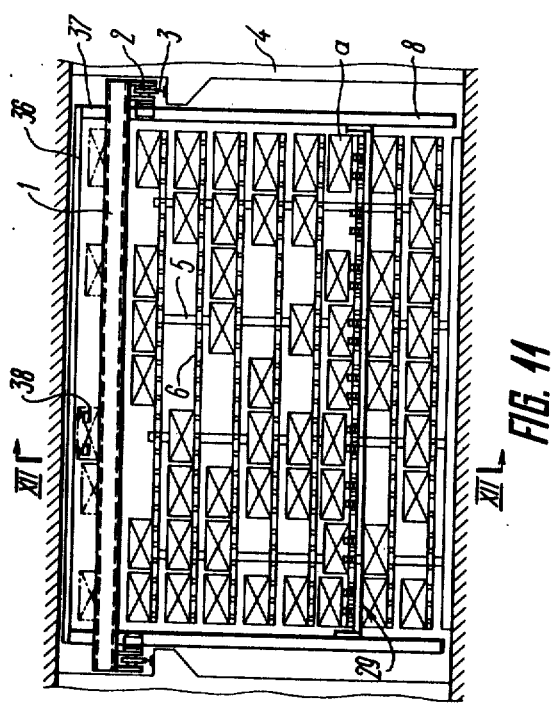
Figure 16:
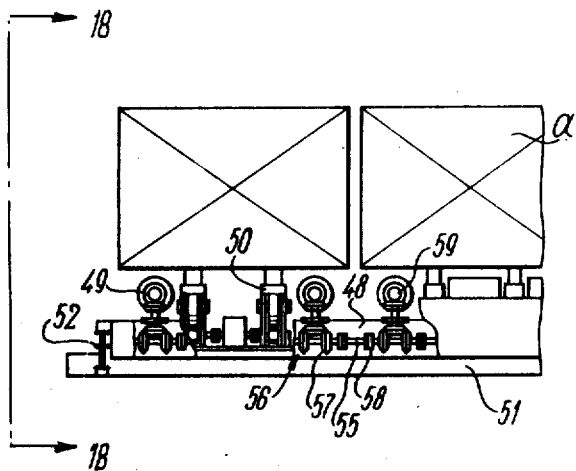
Figure 17:
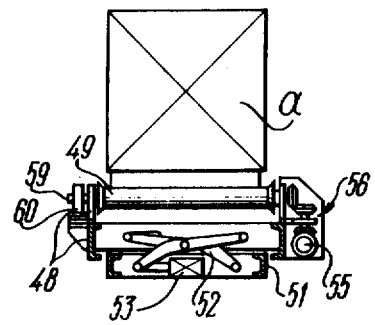
Figure 18:
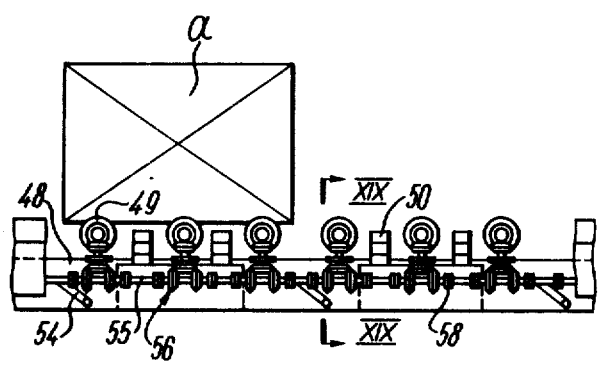
Figure 19:
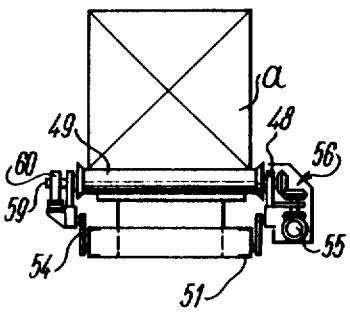

FIG. 7 — same, top view;

FIG. 8 is a section taken along line VIII — VIII in FIG. 6, enlarged;

FIG. 9 shows guides of a device for rearranging the loads with load-carrying elements secured on the frame on both sides of said guides;

FIG. 10 is a section taken along line X—X in FIG. 9 (the load-rearranging device is not shown for convenience);

FIG. 11 is a front view of the stacker crane according to the invention, in a third version;

FIG. 12 is a section taken along line XII — XII in FIG. 11;

FIG. 13 shows fragment "D" in FIG. 12, enlarged;

FIG. 14 is a view along line 14-14 in FIG. 13;

FIG. 15 illustrates the stacker crane according to the invention, in yet another version;

FIG. 16 shows fragment F in FIG. 15, enlarged (rollers moved below grab platforms);

FIG. 17 is a view along line 17—17 in FIG. 16;

FIG. 18 shows fragment F in FIG. 15, enlarged, partly cut-away (rollers lifted above grab platforms); and FIG. 19 is a section taken along line XIX — XIX in FIG. 18.

Now the invention will be described in detail by way of example with reference to the accompanying drawings.

Figure 2:
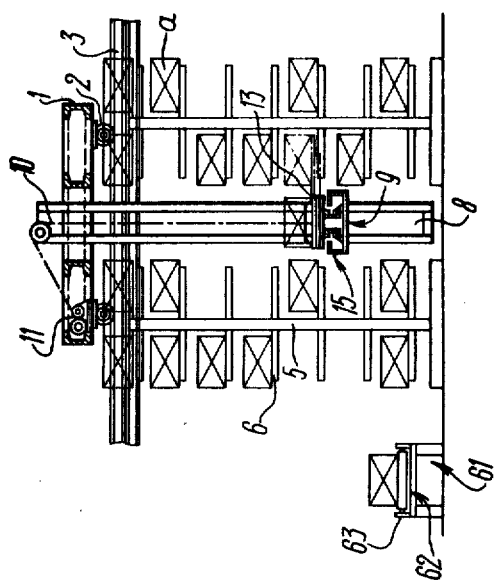
FIG. 2 is a section taken along line II — II in FIG. 1.

The stacker crane comprises a frame 1 (FIGS. 1,2) whose wheels 2 roll over rail tracks 3 secured on building structures 4 (FIG. 1) of the storehouse. The frame 1 is located above racks 5 whose shelves 6 consist of rods arranged at a certain distance from one another (forked shelves) The frame 1 is provided with drives 7 for moving over the rail tracks 3 horizontally, across the racks 5. The frame 1 carries columns 8 (FIGS. 1,2) mounted at a certain distance from the side ends of the racks 5 so that the columns are free to pass by the ends of the racks 5. The columns may be made telescopic, if necessary. The columns 8 are mounted with a handler or load grab 9 which can move along the columns towards the shelves 6 of the racks 5 for which purpose said load grab 9 is connected by cables 10 with a winch 11 (FIG. 2). The winch 11 is installed on the frame 1 and moves the load grab 9 along the columns 8.

The load grab 9 comprises a crosshead 12 arranged along the racks 5 and provided with load-supporting (carrying) platforms 13 (FIGS. 1,2,3) installed throughout the length of the crosshead and intended for placing loads a on the shelves 6 of the racks 5. The platforms 13 are installed on the crosshead 12 at a certain distance from one another said distance ensuring their free passage between the rods of the shelves 6. In the given example the platforms 13 are telescopic and can be extended in the opposite directions by an independent drive 14 (FIG. 4,5) for placing the loads a on the shelves 6 (FIG. 1,2) of the adjacent racks 5.

Figure 1:
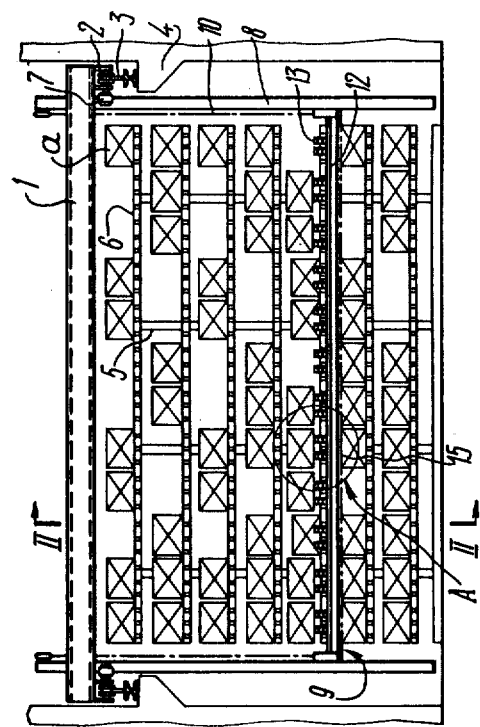
FIG. 1 is a front view of a stacker crane according to the invention.

The stacker crane is provided with a device 15 (FIGS. 1,2) for rearranging the piece loads on the grab 9. The device 15 is installed in guides 16 (FIGS. 3,4) rigidly secured on the crosshead 12. These guides are installed parallel with the crosshead 12 and are equal in length to said crosshead. The device 15 comprises a carriage 17 with load-carrying elements in the form of bars 18 located on the sides of the carriage parallel with the guides 16 and connected with the carriage by means of scissor-type articulated-link mechanisms 19. The articulated-link mechanisms serve to lift the carrying bars 18 above the supporting platforms 13 (shown by dotted lines in FIG. 3) while said bars move the piece load a along the grab 9 and to lift them below the platforms while the loads are being placed by the handler 9 on the racks 5 (FIGS. 1,2).

For this purpose the articulated-link mechanisms 19 are kinematically connected with a drive 20 (FIGS. 3,4,5). The kinematic chain of each articulated-link mechanism comprises a screw 21 (FIGS. 3,5) and nuts 22 connected with the ends of links of the articulated-links mechanisms 19 whose other links carry the bars 18.

The screw 21 is connected with the drive 20 via a gear transmission 23, a shaft 24 and a gear transmission 25 (FIGS. 4,5). To ensure their stable position, the articulated-link mechanisms 19 are connected with the carriage 17 by slides (not shown in the drawing) installed in the slots of brackets 26 which are rigidly secured on the carriage 17. The articulated-link mechanisms 19 are so installed on the carriage 17 that in the course of lifting they pass freely by the ends of the platforms 13.

If the width of the loads a is smaller than the length of the platforms 13, the loads can be removed from the platforms by providing the bars 18 with lateral projections 27 (FIG. 25) which are directed towards the middle of the carriage 17 and arranged at certain distances from one another to ensure free passage of the projections between the platforms 13.

For storehouses with a comparatively small assortment of loads we hereby provide a stacker crane wherein a device 28 (FIGS. 6,7,8), for rearranging the loads a on a load grab 29, is installed in guides 30 (FIGS. 7,8) rigidly secured on the frame 1. These guides are fastened to the frame 1 in close proximity to the load grab 9 lifted to the topmost position.

The device 28 comprises a carriage 31 moving over said guides and provided with load-carrying elements in the form of vertical ribs 32 which are rigidly secured on the carriage 31 perpendicularly to the direction of its movement and are located at a certain distance from one another so as to allow free passage of supporting platforms 33 of the grab 29. The height of these ribs is somewhat larger than that of the platforms 33 of the load grab 29 which allows the platforms 33 to sink fully between the said ribs for placing the load on the ribs 32 of the carriage 31.

For moving the carriage 31 over the guides 30, the carriage is connected with a drive (not shown in the drawing) by a chain transmission 34.

To increase the efficiency of the device used for stacking packs of loads on the racks 5, the frame 1 is provided with load-supporting elements 35 (FIG. 9) installed somewhat below the carrying ribs 32 on both sides of the guides 30 rigidly secured to the frame 1 and supporting the carriage 31 with ribs 32. These load-supporting elements have the form of vertical ribs arranged at a certain distance from one another throughout the length of the guides 30 as shown in FIG. 10, this distance ensuring free passage of the platforms 33 of the grab 29 between the ribs. The height of said elements 35 is somewhat larger than that of the platforms 33 of the grab 29.

If the stacker crane is used in storehouses where piece loads a are stored in hard packing, guides 36 (FIGS. 11,12) are secured on the frame 1 by means of uprights 37 and are arranged above the handler or load grab 29. A device 38 for rearranging the loads on the grab 29 comprises a carriage 39 (FIG. 12) and load-carrying elements which are located on the sides of said carriage and have the form of arms 40 FIGS. 13,14) with horizontal pivots 41 (FIG. 13) rigidly fastened on the carriage 39. The arms 40 located on each side of the carriage 39 are connected in pairs by a rod 42 (FIG. 14). For turning the arms 40, the rod 42 is connected by a link 43 (FIGS. 13,14) with a corresponding drive 44.

The drive utilized in the given example is of the electromagnetic type though any other suitable drive can be used too.

The sufficient force for gripping the loads by the arms 40, is ensured by providing the carriage 39 with springs 45 (FIG. 13) connected to the rods 42.

In the next version of the stacker crane a device 46 (FIG. 15) for rearranging the loads on a grab 47 is installed in guides 48 (FIG. 16) mounted on the grab 47. The device 46 comprises a number of power-driven rollers 49 (FIGS. 16,17) used as load-carrying elements. The power-driven rollers are installed with their ends in the guides 48 and are located between load-supporting (carrying) platforms 50 of the grab 47.

A guides 48 are connected with the crosshead 51 by means of a scissor-type articulated-link mechanism 52. This mechanism is connected kinematically with a drive 53 (FIG. 17) which moves the guides 48 vertically relative to the crosshead 51 for lifting the rollers 49 above the platform 50 while rearranging the piece loads a on the grab 47 and for lowering them below the platforms while stacking the piece loads on the racks 5 (FIG. 15).

In the given example the drive 53 is constituted by an electromagnet though it can take any other form suitable for the given purpose.

In the other version the guides 48 are connected with the crosshead 51 by a four-bar linkage 54 (FIGS. 18,19) kinematically connected with a drive (not shown in the drawing). The drive may be of any known design suitable for the given purpose.

To ensure independent rotation of the rollers 49 (FIGS. 16–19) each roller 49 is connected with a drive shaft 55 via a gear transmission 56.

Bevel gears 57 of the gear transmission 56 installed on the shaft 55 are connected with the latter by means of an electromagnetic coupling 58 (FIGS. 16,18). Besides, shafts 59 (FIGS. 17,19) carrying the rollers 49 are provides with brakes 60. This design of the drive of the rollers 49 allows each roller to rotate in opposite directions independently of one another and be braked, also independently of one another.

The stacker crane operates as follows. During selective gathering of the loads a, the loads of different types delivered to the storehouse are accumulated on a table 61 (FIG. 2). The loads are placed along the table 61 with certains gaps between one another, these gaps being sufficient for the selective removal of the loads by the platforms 13 of the grab 9. The table 61 is a power-driven roller bed 62 whose length is equal to that of the handler or load grab. The rollers of the roller bed 62 are mounted on uprights 63 secured on the table 61. The loads are accumulated on this table in such an order as to ensure a minimum number of their rearrangements on the load grab 9 while stacking the loads on racks.

On starting the winch 11 the load grab 9 goes down towards the table 61. The platforms 13 extend simultaneously and pass between the rollers of the roller bed 62 somewhat below the loads a lying on said rollers (FIGS. 9,10). When the grab 9 is lifted a little, the platforms 13 take the loads off the table 61 and, moving towards each other, bring the loads to in the middle of the grab 9. Then the grab rises to the topmost position together with the loads and passes through an opening in the frame 1. After starting the drives 7, the frame 1 with the lifted grab 9 moves towards a preset rack 5. The grab 9 with the loads is lowered into the aisle between the racks 5 and stops opposite a shelf 6 to be loaded.

The platforms 13 move out in compliance with the loading program which accounts for the number of free spaces on the rack shelves. During the subsequent lowering of the grab 9 the platforms 13 pass through the forked shelf 6 of the rack 5 and stop somewhat below its level. The loads are then placed on respective free portions of the shelves 6 of the racks 5.

The positions of the loads remaining on the grab 9 usually do not correspond to the free spaces on the next shelf 6 to be loaded. In these cases the device 15 for rearranging the loads on the grab 9 comes into action. The carriage 17 or the device 15 moves over the guides 16 towards the required load. At this stage the bars 18 of the carriage 17 are located below the platforms 13 of the grab 9. The carriage 17 stops under the selected load. Now the drive 20 for lifting the bars 18 is started. The screws 21 are set in rotation via the gear transmissions 23 and 25. With the aid of the R.H. and L.H. threads on each screw 21 the nuts 22 move in the opposite directions so that the articulated-link mechanisms 19 lift the bars 18 above the load-carrying platforms 13 of the grab 9.

As the bars are being lifted, the projections 27 pass between the platforms 13 and pick the load a from them. The load is lifted somewhat higher above the other loads located on the grab 9. Then the carriage 17 moves over the guides 16 along the grab 9 to the vacant platform 13 which is to place the next load on the shelf 6 of the rack 5. In the same manner the device 15 transfers the loads onto the other vacant platforms 13 which, according to a preset program, are to place the next lot of loads on the shelf 6 of the rack 5.

The stacker crane with the empty grab 9 returns to the table 61 to pick up the next lot of loads or unloads the racks 5. For removing the loads from the shelves 6 of the racks 5 the above-described operations are reversed.

Operation of the stacker crane employed in stacking packs of loads a is basically similar to that described above. The device 15 for rearranging the loads on the grab 9 takes no part in the operation. The bars 18 of the carriage 17 are located below the load-carrying platforms 17 which move out simultaneously for stacking the packs of loads a on the rack shelves 6 or for removing the loads from the table 61.

In another embodiment of the invention the stacker crane shown in FIGS. 6,7 is employed for selective gathering of loads along lines fundamentally similar to those described above. When the loads a are being shifted on the grab 29, the device 28 for rearranging the loads interacts with the grab 29 lifted to the uppermost position. The carriage 31 of the device 28 moves over the guides 30 rigidly secured to the frame 1 towards the load to be handled. The platform 3 shifts out this load towards the carriage 31 and places it on the ribs 32 of the carriage, sinking into the gaps between these ribs. Then the carriage 31 moves over the guides 30 and stops opposite the vacant platform 33 of the handler or grab 29 which is to place the next load on the shelf 6 of the rack 5. This platform removes the load from the ribs 32 of the carriage 31. Other loads are rearranged on the grab 29 in a similar way.

The efficiency of the stacker crane can be increased by using a load-storing device 64 (FIGS. 7,8) installed parallel to the grab 29 and carrying vertical ribs 69 arranged along the length of the device at a certain distance from one another. The platforms 33 of the grab 29 put the lot of loads removed from the roller bed 62 of the table 61 on the ribs 65 of the storing device 64.

While the loads a are being placed on the racks 5, the loads can be removed by the platforms 33 from the storing device 64 and, if necessary, transferred onto the other vacant platforms 33. If the storing device 64 takes part in the operation, the rack loading and unloading programs can be combined. In this case the loads are removed from the storing device 64 and placed on the racks 5 while other loads removed from the shelves 6 of the racks 5 are placed in the vacated spaces of the storing device 64.

When the load-supporting elements 35 shown in FIG. 9 are installed on both sides of the guides 30, selective gathering of the loads is performed by the stacker crane which operates basically as described above. When the loads are stacked in packs, the carriage 31 of the device 28 is withdrawn from the zone where the loads are placed on the elements 35. This makes it possible to put a third pack of loads on the elements 35 between which the platforms 33 pass freely in the course of load stacking.

In the next version of the stacker crane shown in FIGS. 11,12 the loads a are rearranged on the handler or grab 29 during selective gathering of the loads as follows. The grab 29 picks the loads off the roller bed 62 of the table 61 and places them into the racks 5 according to a preset program. If the positions of the loads remaining on the grab 29 do not correspond to the vacant places in the rack 5 which are to receive the next loads, the device 38 for rearranging the loads comes into action.

The grab 29 moves to the topmost position and stops so that the loads on it are located somewhat below the arms 40. The carriage 39 moves along the guides 36 and stops opposite the load a that is to be moved. On starting the drives 44 of the arms 40 the latter open in opposite directions, away from the middle of the carriage 39. The grab 29 rises somewhat, the drives 44 are cut off and the arms 40 actuated by the springs 45 to grip the load. The grab descends a distance somewhat larger than the height of the load and the carriage 39 shifts the load to the preset point of the grab 29. Placing of the load on the grab 29 is similar to its removal but is performed in a reverse sequence of operations.

When the loads are stacked on racks 5 in packs, the carriage 39 takes no part in the operation. This carriage can be withdrawn from the zone above the load pack lifted by the grab 29 or it can be left above the loads though in this case its arms 40 should be opened to save the headroom of the storehouse.

In the next version of the stacker crane shown in FIG. 15 the crane is operated, mainly, as described in the above-mentioned versions. During the selective gathering of loads, these a are rearranged on the handler or grab 47 as follows. If the positions of the loads remaining on the grab 47 do not correspond to the free spaces in the rack 5, the device 46 for rearranging the loads on the grab 47 comes into action. The drive 53 for the vertical movement of the guides 48 of the device 46 is started, the rollers 49 rise above the platforms 50 of the grab 47 and remove the loads a from the platforms. Then the corresponding electromagnetic couplings 58 are switched on. The corresponding rollers 49 are coupled to the drive shaft 50 and start rotating clockwise or counterclockwise to suit the preset program. The loads a are carried by the rollers 49 to the assigned points of the grab. On switching off the electromagnetic couplings 58 and braking the shafts 59 with the brakes 60, the load stops on the rollers 49 precisely where required. In this version a number of loads a can be rearranged simultaneously.

In describing the embodiments of the invention the terms in their narrow sense are used for the sake of lucidity. However, the invention is not confined to the narrow sense of the terms used and it will be understood that each of the terms embraces all the equivalent elements functioning similarly and employed for the same or similar purposes.

While specific embodiments of the invention have been disclosed in the description, it will be understood that various modifications and changes within the spirit and the scope of the invention may occur to those skilled in the art. These changes and modifications can be resorted to without departing from the function or the scope of the invention.

We claim:

1. A stacker crane for use in storehouses where piece loads (a) are kept on racks, (5) having shelves (6) thereon, comprising: a frame (1) for moving horizontally across the racks; said frame carrying columns (8) secured on said frame at a certain distance from the side ends of said racks; said columns being provided with a handler (9) mounted thereon with provision for moving along them, and including a crosshead (12) located between said columns along the racks; said handler carrying a plurality of telescopic load-supporting platforms (13) arranged on said crosshead throughout its length at a certain distance from one another and interacting with the shelves in the course of load placing and removal; guides (16) positioned parallel to said crosshead and practically of the same length as said crosshead; and a device (15) for rearranging the piece loads on said handler, said device being provided with load-carrying elements (18) for receiving the piece loads from said load-supporting platforms, and installed movably with relation to said guides; wherein the latter are rigidly mounted to said crosshead, and said rearranging device includes a carriage (17) installed in said guides; said load-carrying elements being in the form of bars (18) arranged at the sides of said carriage parallel to said guides, below said load-supporting platforms, and being kinematically linked with said carriage by means of articulated link mechanisms (19) which include a drive (20) for moving said bars vertically above said load-supporting platforms, while rearranging the piece loads on said handler and below said platforms while stacking them on the racks.

2. The stacker crane as defined in claim 1, wherein said bars (18) have lateral projections (27) directed towards the middle of said carriage (17) and are spaced at such distances from one another as to ensure free passage of said projections between said load-supporting platform (13).

* * * * *